Nov. 24, 1953

C. H. JOHNSON 2,659,960

SEMIAUTOMATIC TURRET LATHE

Filed May 27, 1948

Charles H. Johnson
INVENTOR.

BY Andrus & Scaler

ATTORNEYS.

Nov. 24, 1953  C. H. JOHNSON  2,659,960
SEMIAUTOMATIC TURRET LATHE
Filed May 27, 1948  15 Sheets-Sheet 2

Charles H. Johnson
INVENTOR

BY
ATTORNEYS.

Nov. 24, 1953 C. H. JOHNSON 2,659,960
SEMIAUTOMATIC TURRET LATHE
Filed May 27, 1948 15 Sheets-Sheet 3

Charles H. Johnson
INVENTOR

BY *Andrus & Sceales*

ATTORNEYS.

Nov. 24, 1953
C. H. JOHNSON
2,659,960
SEMIAUTOMATIC TURRET LATHE
Filed May 27, 1948
15 Sheets-Sheet 4
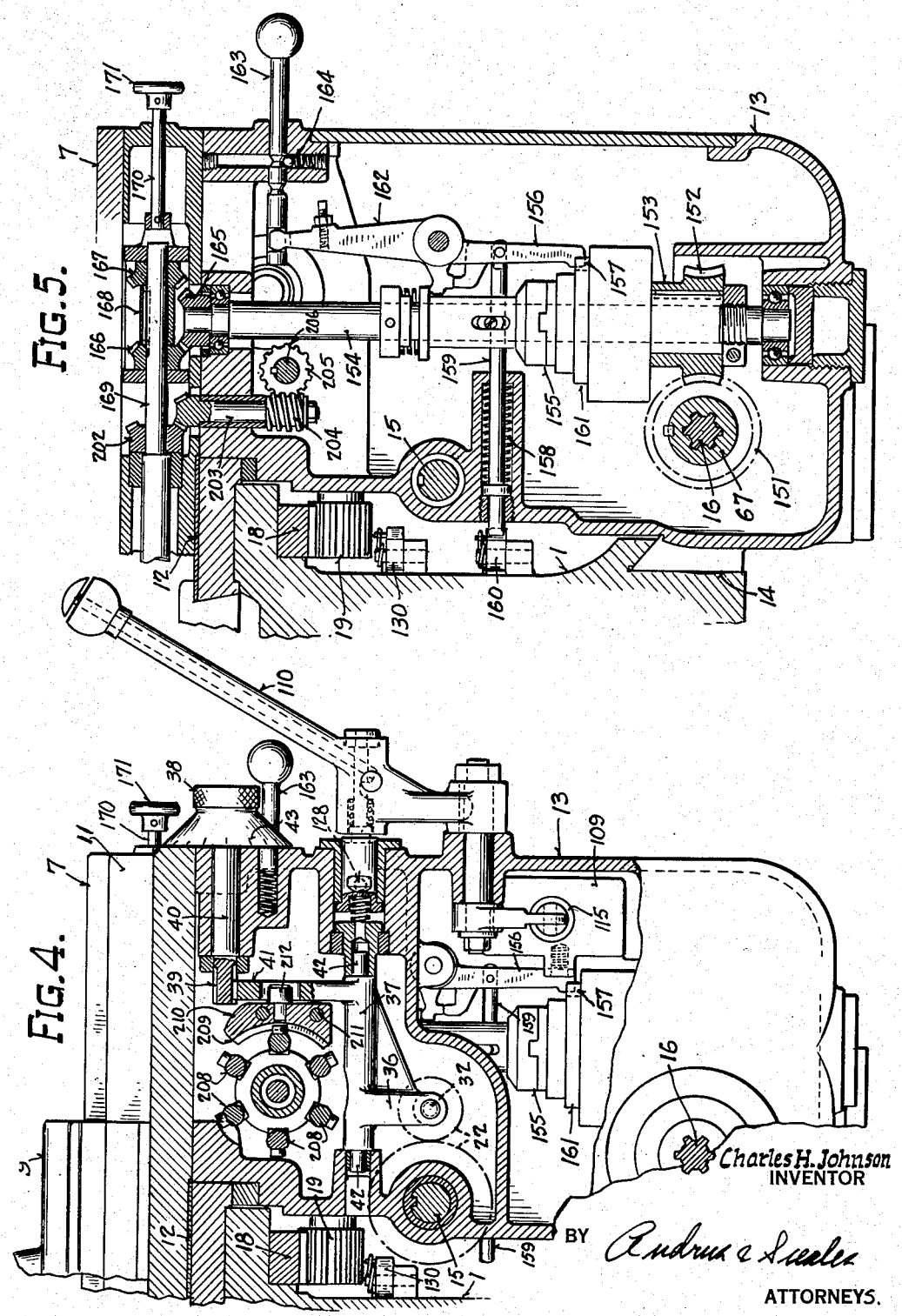
Charles H. Johnson
INVENTOR
BY Andrus & Sceales
ATTORNEYS.

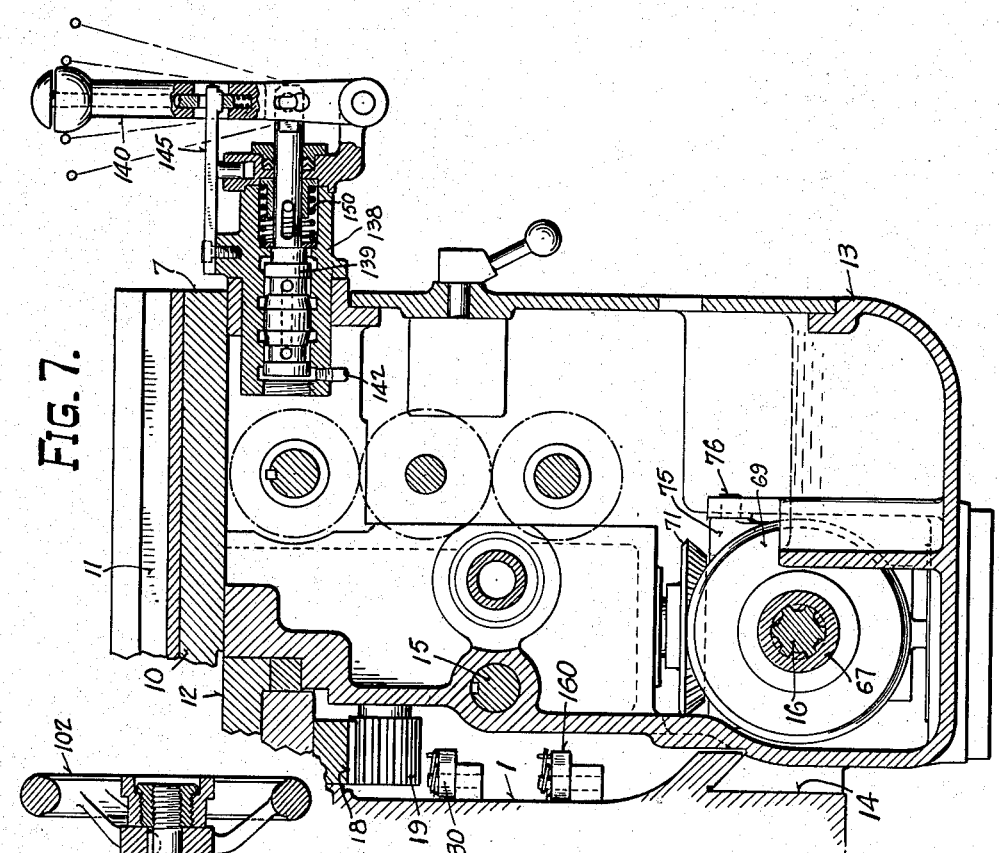

Nov. 24, 1953    C. H. JOHNSON    2,659,960
SEMIAUTOMATIC TURRET LATHE
Filed May 27, 1948    15 Sheets-Sheet 6
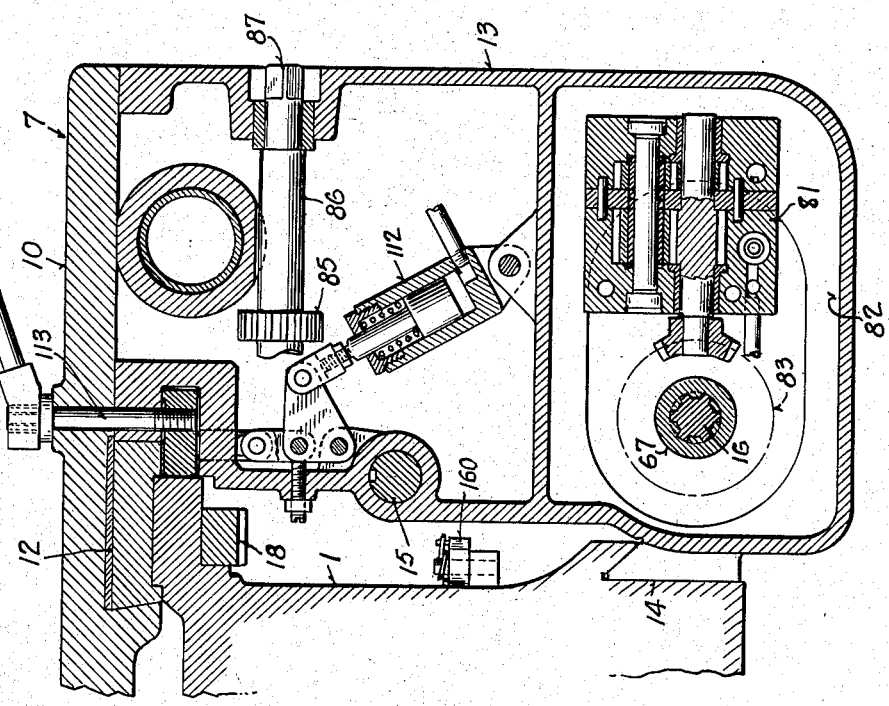
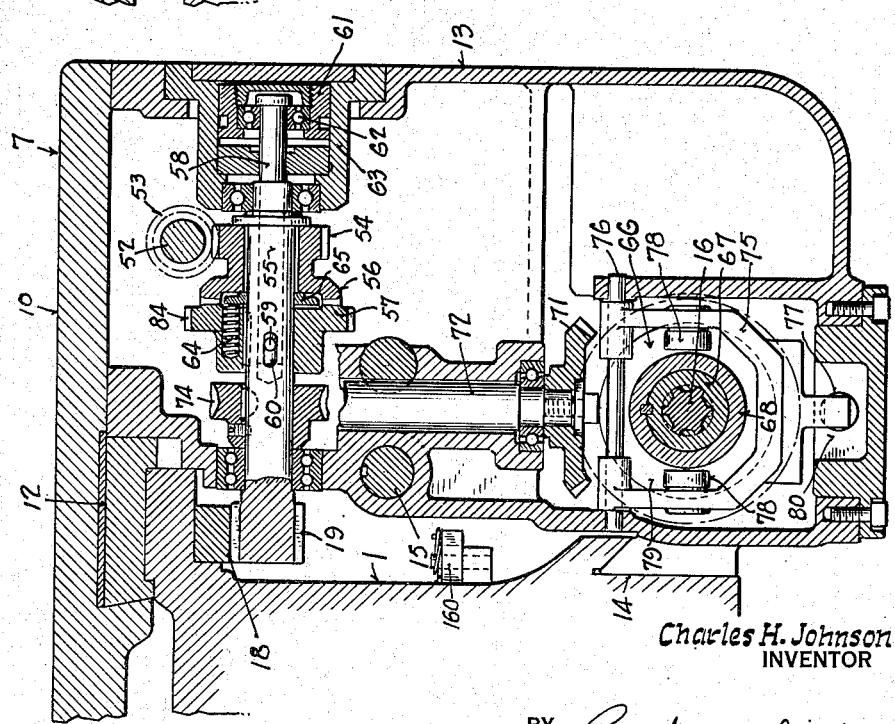
Charles H. Johnson
INVENTOR
BY *Andrus & Nealer*
ATTORNEYS.

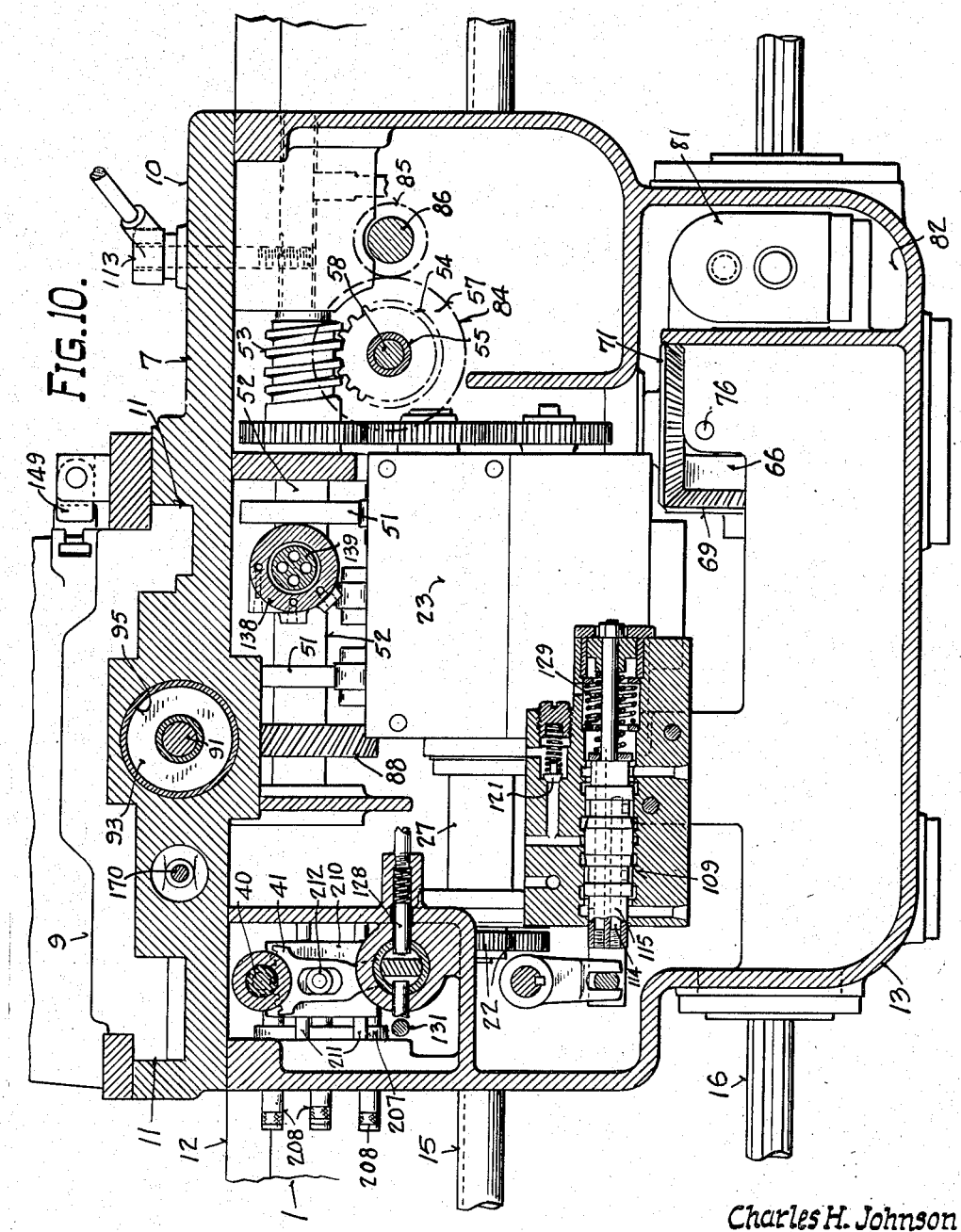

Nov. 24, 1953

C. H. JOHNSON 2,659,960

SEMIAUTOMATIC TURRET LATHE

Filed May 27, 1948

Charles H. Johnson
INVENTOR

BY Andrus & Scales

ATTORNEYS.

Nov. 24, 1953

C. H. JOHNSON 2,659,960

SEMIAUTOMATIC TURRET LATHE

Filed May 27, 1948

Charles H. Johnson
INVENTOR.

BY Andrus & Sceales
ATTORNEYS.

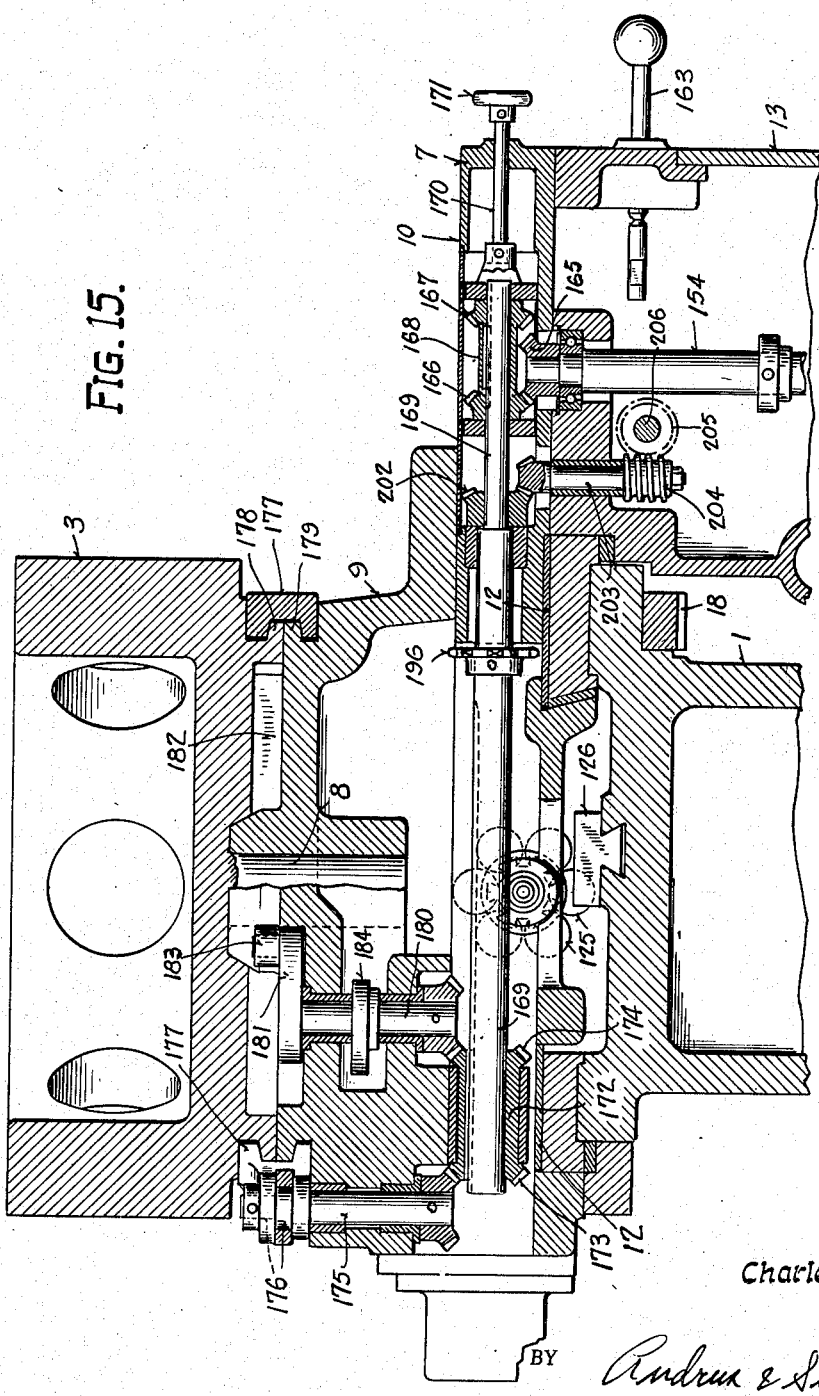

Nov. 24, 1953 — C. H. JOHNSON — 2,659,960
SEMIAUTOMATIC TURRET LATHE
Filed May 27, 1948 — 15 Sheets-Sheet 13
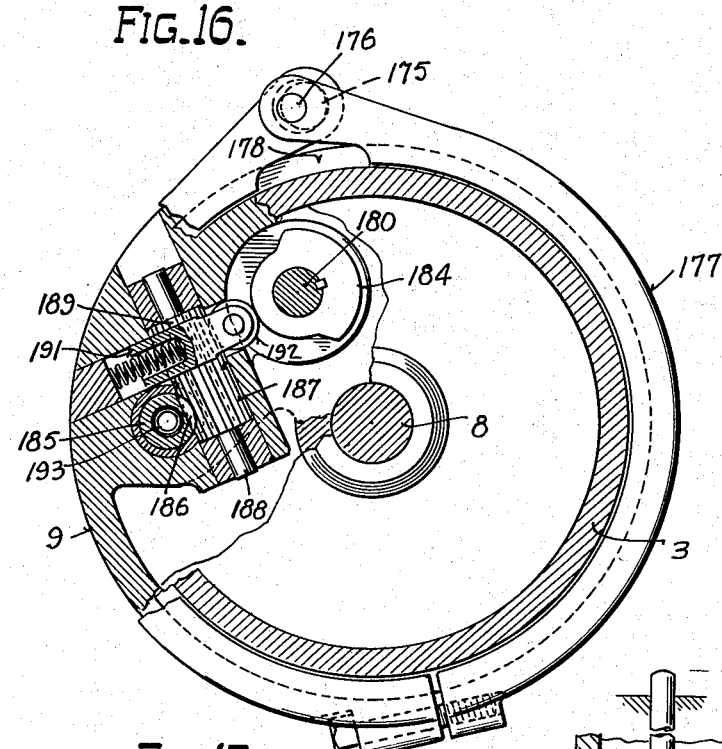
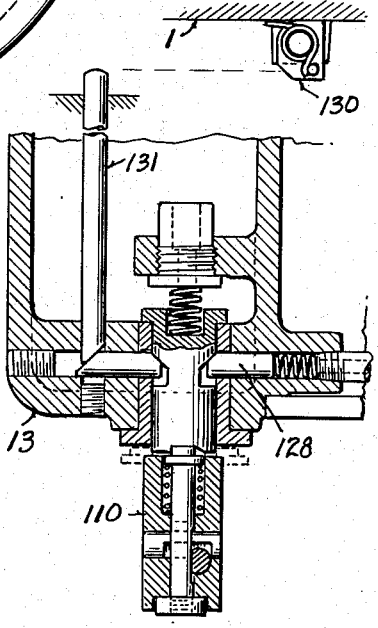
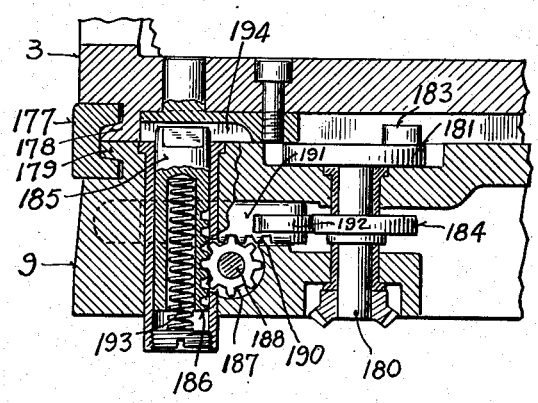
Charles H. Johnson
INVENTOR.
BY *Andrus & Scealer*
ATTORNEYS.

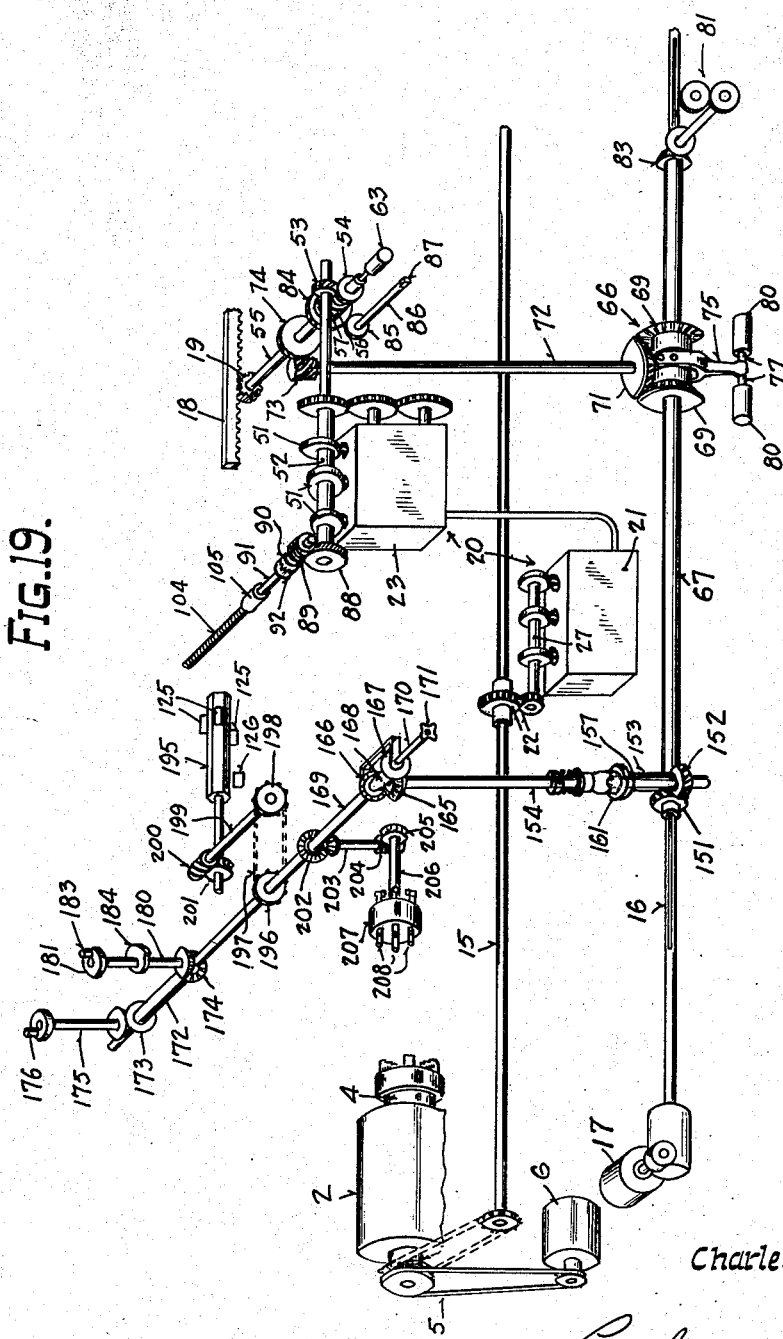

Nov. 24, 1953
C. H. JOHNSON
2,659,960
SEMIAUTOMATIC TURRET LATHE
Filed May 27, 1948
15 Sheets-Sheet 15
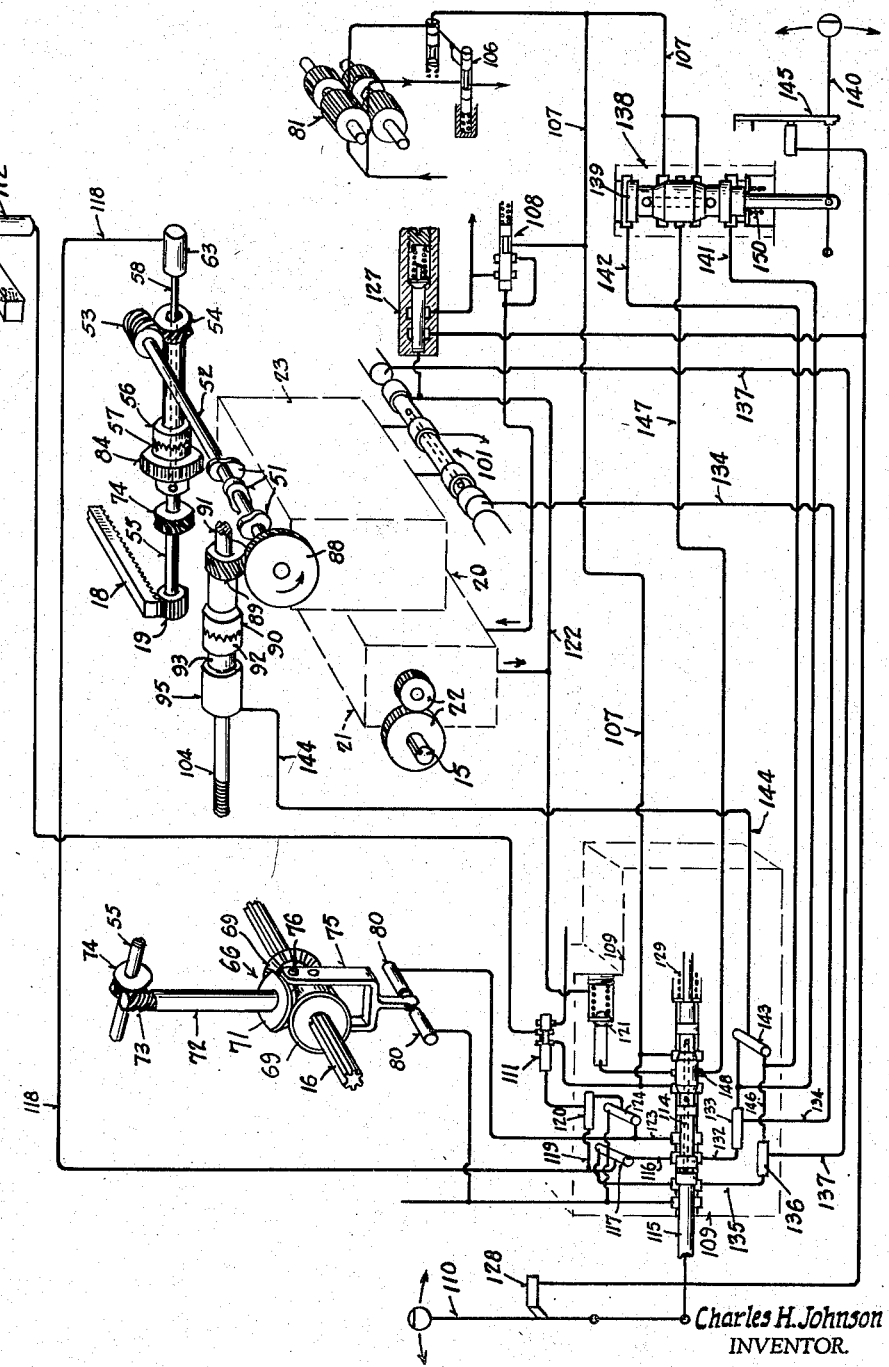
Charles H. Johnson
INVENTOR.
BY *Andrus & Sceales*
ATTORNEYS.

Patented Nov. 24, 1953

2,659,960

UNITED STATES PATENT OFFICE 2,659,960

SEMIAUTOMATIC TURRET LATHE

Charles H. Johnson, Madison, Wis., assignor to Gisholt Machine Company, Madison, Wis., a corporation of Wisconsin Application May 27, 1948, Serial No. 29,587

22 Claims. (Cl. 29—42)

This invention relates to a semi-automatic turret lathe.

The invention has been applied to the construction and operation of the turret carriage and turret indexing mechanism of a lathe, and it is similarly applicable to the construction and operation of the tool carriage and indexing mechanism. It is applicable to both fixed center and cross sliding turret carriages.

One of the principal objects of the invention is to provide for faster operation of the generally large manually controlled type of turret lathe.

Another object of the invention is to relieve the operator from effort and fatigue.

Another object is to provide for pre-selection of feed rates and for certain optional automatic operating features of fully automatic lathes and at the same time make it possible for the operator to control the several operations manually if desired or when necessary.

Another object is to provide an accurate compact mechanism for carriage and cross slide power feed and traverse in both directions and for turret or tool power indexing, locking and clamping, under the manual control of the operator at all times.

Another object is to provide improved stop construction for manually controlled turret lathes.

Another object is to provide selectively either automatic power turret indexing, or manually controlled and reversible power turret indexing or manual turret indexing.

Another object is to provide for pre-selection of the feed rate for each face of the turret which eliminates resetting of the feed rate by the operator for each face, if the operator so desires, and at the same time provide for disconnecting the pre-selection where the operator desires to select the rate manually.

Another object is to eliminate step by step feed rate change and provide for accurate selection of the exact feed rate without interruption by passing through intermediate rate mechanism.

Another object is to combine under a single manual lever control both forward feed, semi-traverse and high speed traverse and back feed, semi-traverse and high speed traverse.

Another object is to simplify and make more positive the interlock between different lathe operations to prevent interference therebetween.

Another object is to provide an automatic clamp for the carriage whenever the feed is stopped or the feed lever is in neutral, thereby relieving the operator from actuating a manual clamp.

Another object is to reduce the number of levers to be actuated and the number of operations to be manually started or shifted by the operator so that there is less operator fatigue and a slow operator can produce nearly as much as a fast operator.

Other objects and advantages appear hereinafter.

An embodiment of the invention is illustrated in the accompanying drawings in which:

Fig. 4 is a transverse vertical section taken on line 4—4 of Fig. 2 through the manual feed rate selector and control lever;

Fig. 5 is a similar section taken on line 5—5 of Fig. 2 through the manual control for power indexing of the turret;

Fig. 6 is a similar section taken on line 6—6 of Fig. 2 through the cross slide feed screw and its control mechanism;

Fig. 7 is a similar section taken on line 7—7 of Fig. 2 showing the control for power cross feed;

Fig. 8 is a similar section taken on line 8—8 of Fig. 2 through the high speed forward and back traverse clutch;

Fig. 9 is a similar section taken on line 9—9 of Fig. 2 through the booster pump and carriage clamp;

Fig. 10 is a longitudinal vertical section taken on line 10—10 of Fig. 3 just behind the front apron cover;

Fig. 15 is a vertical axial section through the turret taken on line 15—15 of Fig. 3;

Fig. 16 is a detail horizontal section showing a part of the indexing mechanism;

Fig. 17 is a detail section showing the mechanism of Fig. 16;

Fig. 18 is a horizontal section taken on line 18—18 of Fig. 2;

Fig. 19 is a diagrammatic view showing the various controls; and

Fig. 20 is a corresponding diagrammatic view showing the hydraulic circuits.

Figure 1:
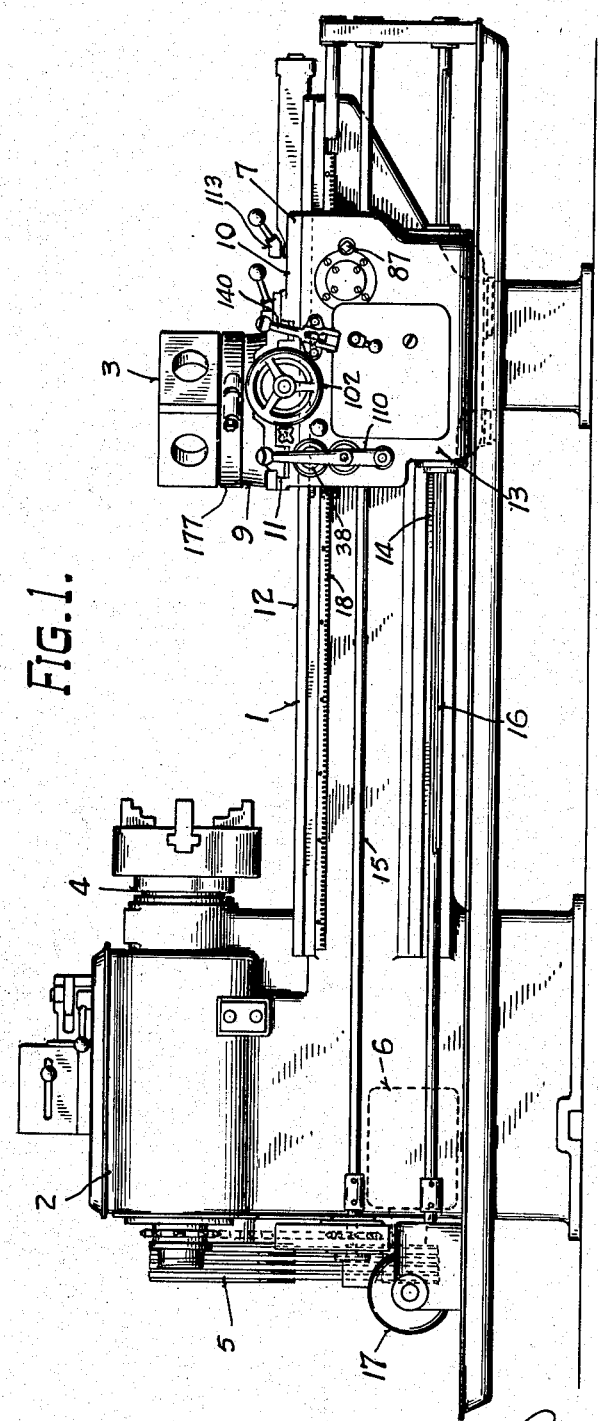
Figure 1 is a front side elevation of a turret lathe having the invention incorporated in the turret carriage and apron.
Figure 2:
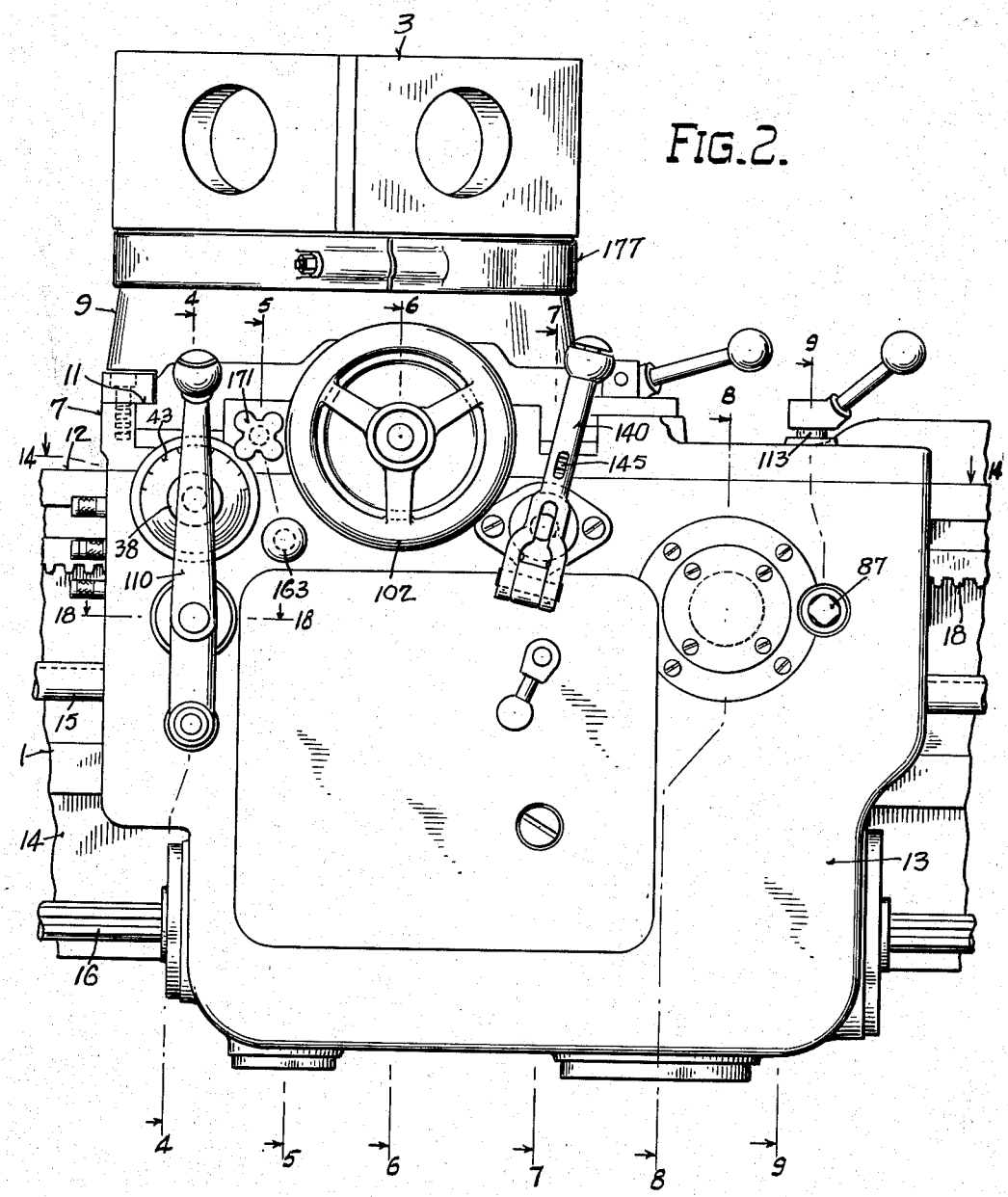
Fig. 2 is an enlarged front elevation of the turret apron.

The lathe of the present invention is usually of the larger type which is not susceptible of full automatic control and which is ordinarily classed as a manually operated lathe. While attempts have been made to provide mechanical power operation of the various functions there has been little relief for the operator from the necessity to operate numerous levers in a given sequence and from constant attention to the lathe.

The present invention incorporates in a manually controlled turret lathe means to perform the several functions by power operation and to make certain of the functions automatic in sequence, thereby relieving the operator. It also provides for selective manual or automatic control of the major functions.

The lathe comprises, in general, a bed 1 having a headstock 2 secured thereon at one end and a turret 3 at the other end.

A rotary spindle 4 is disposed in the headstock 2 and driven at selected speeds by suitable clutch and gear shift mechanism in the headstock, which in turn is driven by the belt 5 from motor 6.

The turret 3 is mounted on the carriage 7 and disposed for indexing rotation on a vertical spindle 8 extending upwardly from cross slide 9.

A carriage top 10 supports the cross slide 9 on suitable transverse ways 11 and in turn moves longitudinally of bed 1 on a pair of longitudinal ways 12.

The front apron 13 for carriage 7 extends downwardly from the carriage top 10 and rides along the front way 14.

A feed shaft 15 extends longitudinally of the bed 1 and passes through the apron 13. The feed shaft 15 is driven from spindle 4 by suitable gearing in the headstock 2 and the feed shaft speed is therefore directly proportional to the spindle speed.

A high speed traverse shaft 16 extends longitudinally of the bed 1 below shaft 15 and passes through the apron 13. The traverse shaft 16 is driven by a separate motor 17 at a constant speed.

A rack 18 is disposed below the upper front way 12 and is engaged by a feed gear 19 extending rearwardly from apron 13 to effect feeding and semi-traverse of the carriage 7 along the bed 1.

The feed of carriage 7 is preferably effected hydraulically instead of by means of the usual gear trains from feed shaft 15. For this purpose a pump and motor unit 20 is provided that has a substantially constant torque output over a large range of speeds including particularly very low speeds.

The pump 21 of the unit 20 is carried by apron 13 and driven directly from feed shaft 15 by the spur gears 22, and is preferably of the same type and construction as that illustrated in the copending application of L. E. Godfriaux, Serial No. 554,884, filed September 20, 1944, and assigned to the same assignee as the present invention, now abandoned.

The motor 23 of the unit is carried by apron 13 and driven directly by the oil delivered from pump 21, and is preferably of the same type and construction as that illustrated in the copending application of L. E. Godfriaux, Serial No. 554,883, filed September 20, 1944, now Patent No. 2,471,484, granted May 31, 1949, and assigned to the same assignee as the present invention.

Both the pump 21 and motor 23 are small in size and space requirements for the power necessary to feed the carriage 7 under all working conditions. The pump has an infinitely variable output volume within the range of speeds required and the motor has a substantially constant torque output throughout the range of speeds effected by the oil discharged from the pump when fed thereto.

Figure 12:
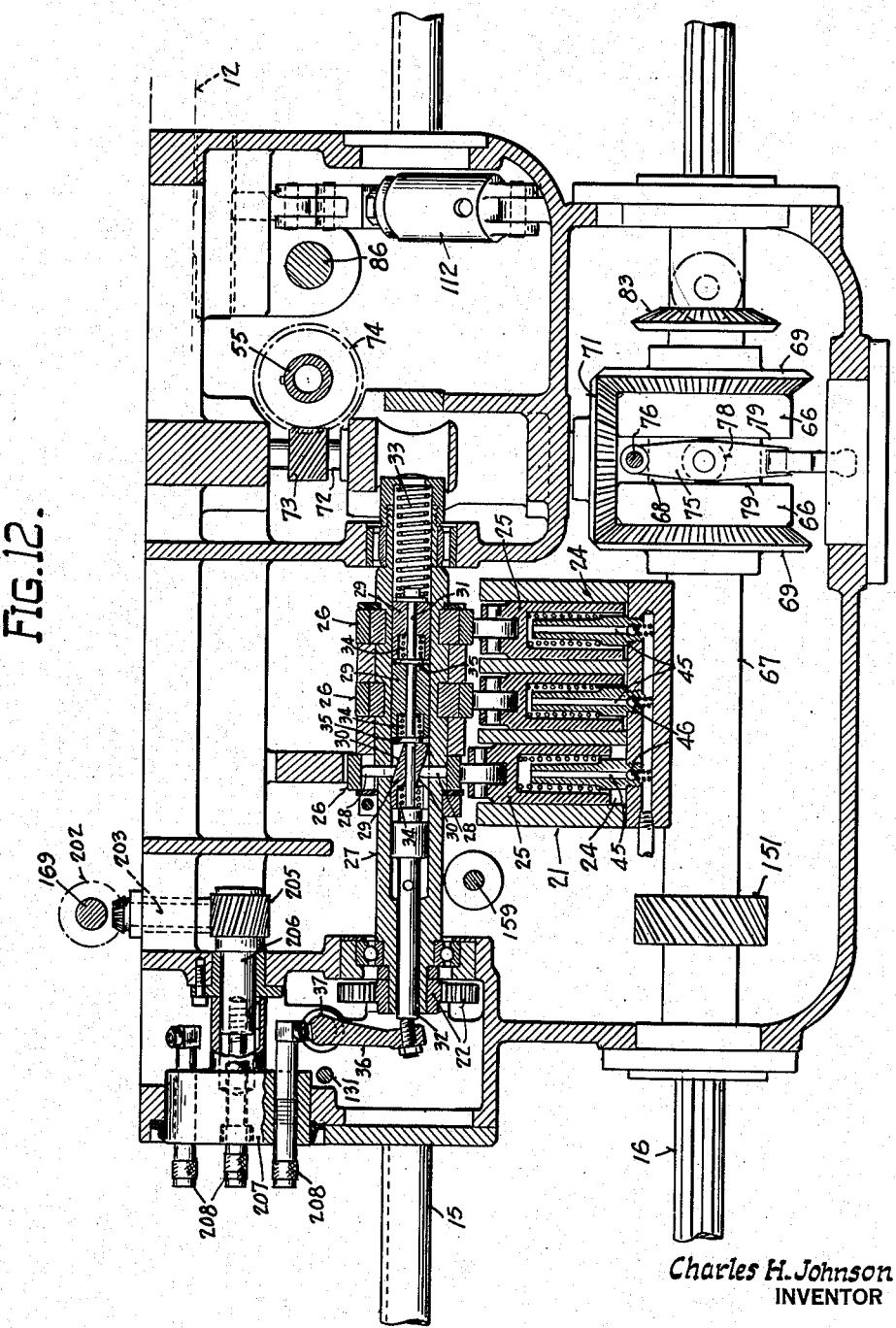
Fig. 12 is a similar section taken on line 12—12 of Fig. 3 through the axis of the variable speed pump.

The pump 21 is illustrated in Figs. 6 and 12 and comprises, in general, three cylinders 24, each having a long skirted short stroke hollow piston 25 therein. The pistons 25 are driven by corresponding rotating rings 26 mounted eccentrically upon the pump shaft 27 driven by gears 22 from feed shaft 15. The eccentricity of rings 26 can be varied at will to correspondingly vary the stroke of pistons 25 and the output of the pump 21.

Each ring 26 is adjusted and controlled in its eccentricity by a pair of pins 28 disposed diametrically opposite each other in holes in the shaft and which in turn are supported internally on a longitudinally movable member 29 having a longitudinal cam groove 30 of tapered depth for receiving each pin, the inclined bottoms of the grooves 30 constituting cams for moving the pins 28 in unison in either direction diametrically of the shaft. The cam members 29 are mounted for reciprocation on and with a central control rod 31 which is made up of separate sections and which extends out through one end of the shaft 27 to provide a control button 32 for controlling the output of the pump.

The control rod 31 is made up of a plurality of separate sections, the first section extending through the end of shaft 27 to engage the next succeeding section, and each succeeding section corresponding to the respective cylinders and to cam members 29.

The sections of rod 31 are disposed end to end and are moved inwardly against a strong spring 33 in the opposite end of shaft 27. The cam members 29 are biased to an inward position on rod 31 by means of individual coil springs 34 encircling rod 31 and extending in a hollow cup shaped end of each corresponding member 29 with the inner end of each spring engaging the plug and the outer end of each spring engaging a flange head 35 on the corresponding next outermost section of the rod.

Inward movement of rod 31 by pressure on button 32 increases the eccentricity of rings 26 and the volume of output of the pump, and outward movement of rod 31 by release of pressure on button 32 reduces the volume output of the pump. By dividing rod 31 into sections the outward movement of the first section does not require an immediate outward movement of the other sections, and a time lag is provided which enables each section to adjust itself when free to do so relative to the operative position of the corresponding cylinder piston 25.

Movement of rod 31 in or out is effected by lever 36 on a pivotal shaft 37. The shaft 37 is operated manually by a rotary knob 38 on the front of the apron through a pinion 39 on the inner end of the knob shaft 40 and which meshes with a gear segment 41 on the shaft 37 for lever 36. The shaft 37 rotates by means of trunnions 42 held by parts of the apron.

A dial 43 encircling the edge of knob 38 indicates the feed rate set manually by the knob by means of pointer 44.

The pump 21 delivers pressure fluid, preferably oil, through the pump cylinder outlets 45 which have ball check valves 46 therein and through distributor passages 47 to motor 23.

Figure 11:
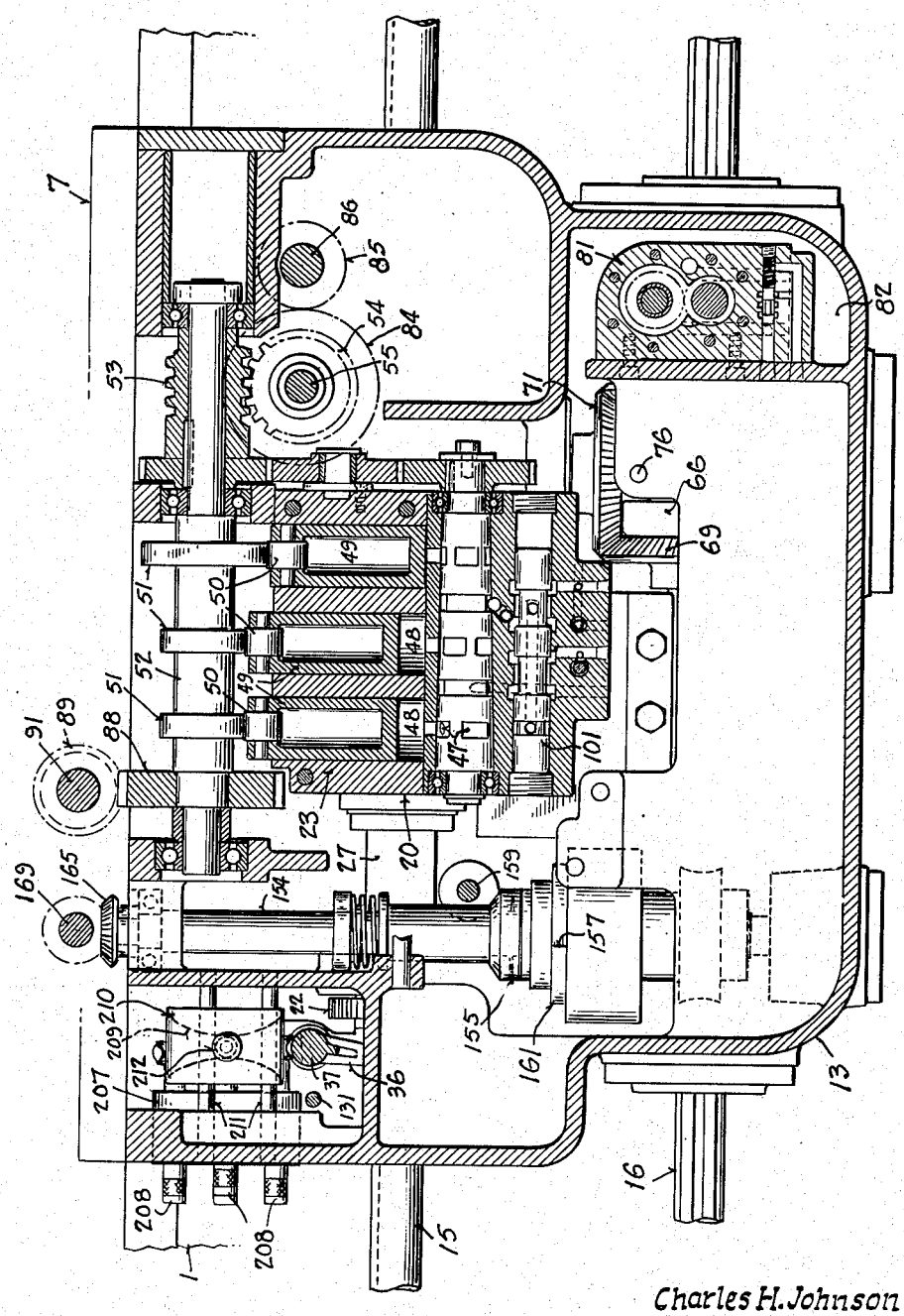
Fig. 11 is a similar section taken on line 11—11 of Fig. 3 through the position of the motor axis and distributor.

The motor 23 is illustrated in Figs. 6 and 11 and comprises, in general, a plurality of cylinders 48 having long skirted pistons 49 operable therein. Each piston head carries a roller 50 which engages and drives a cam 51 on the output shaft 52 for the motor.

The cams 51 are constructed to provide for two working strokes of each corresponding piston for each revolution of the shaft 52, and with a motor having three pistons and cams operating in succession it is possible to provide a substantially constant torque upon the shaft by the pistons for a given flow of fluid to the cylinders 48 through distributor passages 47 from the pump 21.

The motor shaft 52 has a worm gear 53 at one end which drives a corresponding gear 54 floating on the feed shaft 55. The gear 54 has a clutch member 56 at one end adapted to be engaged by a sliding clutch member 57 which is keyed on shaft 55, to thereby effect rotation of shaft 55 with gear 54 when it is desired to power feed the carriage 7. Shaft 55 carries feed gear 19 meshing with rack 18.

The clutch 56—57 is operated by means of a rod 58 extending axially into the front end of shaft 55. A transverse pin 59 extends through the inner end of operating rod 58, through slots 60 in the hollow of shaft 55 and into the clutch member 57 to move the latter longitudinally on shaft 55 when rod 58 is moved longitudinally of the shaft. Movement of rod 58 is effected by a piston 61 secured to the outer end of the rod by means of a thrust bearing 62 and operated in cylinder 63 by fluid pressure adapted to move the piston in a direction effecting clutching of members 56 and 57. A plurality of springs 64 are disposed between clutch member 57 and a washer 65 keyed to shaft 55 to rotate therewith and bearing against clutch member 56, to effect separation of the clutch members 56 and 57 when fluid pressure is exhausted from cylinder 63.

Shaft 55 is enlarged at its inner end to provide the spur gear 19 which meshes with rack 18 to effect movement of carriage 7 upon rotation of shaft 55 in either direction.

Shaft 55 additionally effects traverse of carriage 7 in both directions by means of a hydraulically controlled reversing clutch 66 operatively connecting and disconnecting shaft 55 with the longitudinal traverse shaft 16.

Clutch 66 comprises a sleeve 67 splined to the traverse shaft 16 to rotate therewith, and which sleeve is mounted in suitable bearings in apron 13. A central clutch member 68 is keyed to the sleeve 67 and is disposed for limited axial movement thereon in either direction. A pair of floating beveled gears 69 are mounted for free rotation on sleeve 67, one gear being disposed at each end of member 68. A plurality of clutch discs 70 are disposed between member 68 and the respective gears 69 with alternate discs connected to rotate with member 68 and the remainder of the discs connected to rotate with the corresponding gears 69. The gears 69 mesh with corresponding opposite sides of a single beveled gear 71 disposed therebetween to effect driving of a vertical shaft 72 extending upwardly to shaft 55.

The shaft 72 has a spiral gear 73 at its upper end meshing with a gear 74 on shaft 55.

The traverse clutch 66 is operated by means of a bifurcated yoke 75 having its upwardly extending arms pivoted on a transverse pivot 76 above the clutch and its lower central arm extending downwardly between two opposite pistons 77 for operating the same. The upwardly extending arms of yoke 75 extend on opposite sides of clutch member 68 and each has a roller 78 riding between flange surfaces 79 of the member 68 to effect axial movement of clutch member 68 in response to pivotal movement of the yoke 75 by pistons 77.

The pistons 77 are disposed in opposite cylinders 80 extending parallel to the sleeve 67 and to which fluid pressure is admitted alternately for effecting the desired clutching movements. Movement of yoke 75 in one direction effects gripping of clutch discs 70 at the end toward which the member moves and causes the corresponding gear 69 to drive gear 71 and shaft 72 for traversing the carriage 7 in one direction. Movement of yoke 75 in the opposite direction effects gripping of clutch discs 70 at the other end, toward which the clutch member 68 moves and causes the other corresponding gear 69 to drive gear 71 and shaft 72 in the opposite direction for traversing the carriage 7 in the opposite direction. Relief or equalization of pressure in the two cylinders 80 releases the clutching action so that shaft 55 can be operated by motor 23 for feeding the carriage without interference from the traverse shaft 16.

A gear pump 81 is disposed in the lower part of apron 13 which constitutes a sump 82. The pump 81 is driven by a gear 83 on rotating sleeve 67 and it supplies pressure fluid through suitable valves to the several clutch operating cylinders 63 and 80, and also to the pump 21.

For the purpose of manual setting of the lathe, provision is made for manually inching the carriage separate from both the power feed and power traverse thereof. This is accomplished by a spur gear 84 on clutch member 57 which meshes with a similar gear 85 on a transverse shaft 86 extending through the front of apron 13. The outer end of shaft 86 has a square head 87 thereon for receiving a wrench or other manual operating means. During manual inching of the carriage fluid pressure should be released from cylinder 63 so that the clutch member 57 rides free from member 56.

The motor 23 also effects feeding of the cross slide 9. For this purpose, a helical gear 88 on shaft 52 meshes with a corresponding gear 89 on a clutch member 90 freely rotatable on the transverse cross slide shaft 91. A clutch member 92 is adapted to move longitudinally on shaft 91 to engage and disengage member 90, and is keyed to the shaft to rotate the latter when the clutch members 90 and 92 are in engagement.

Operation of the clutch 90—92 is effected by a circular piston 93 having a thrust bearing 94 disposed between the rotating member 92 and the piston. The piston 93 operates in a cylinder 95, and admission of fluid pressure from pump 81 to the cylinder forces the piston in a direction to effect driving engagement between clutch members 90 and 92.

The clutch 90—92 is released by means of a spring 96 in the hollow inner end of shaft 91 and which extends between a plug 97 in the end of the shaft and a push rod 98 bearing against a transverse pin 99. The pin 99 extends through a slot 100 in shaft 91 and into the body of clutch member 92 so that movement of pin 99 longitudinally of shaft 91 in slot 100 effects a corresponding movement of clutch member 92, and vice versa. The spring 96 opposes the fluid pressure in cylinder 95 and serves to release the clutch when fluid pressure is exhausted from the cylinder.

Reversal of motor 23 by a suitable reversal valve 101 disposed between pump 21 and distributor 47 effects a reversal in movement of slide 9. The feed and back feed of slide 9 may be effected in this manner without regard to the feed of carriage 7 since clutch 56—57 is operable separately from the cross slide clutch 90—92.

Manual movement of cross slide 9 is provided by means of hand wheel 102 on the outer end of shaft 91 and which is operable when clutch 90—92 is disengaged. A dial 103 may be provided at the base of hand wheel 102 to indicate the manual adjustment of the cross slide for set-up purposes.

The shaft 91 is coupled to the feed screw 104 for cross slide 9 by coupling 105 to provide for the use of a taper attachment and effect a driving of the feed screw by the shaft.

The cross slide 9 may be given a feed movement either independently of or simultaneously with the feed movement of carriage 7. Likewise, the cross slide 9 may be given a semi-traverse movement either independently of or simultaneously with the semi-traverse movement of carriage 7, as desired.

The hydraulic circuits for operating the carriage and slide are shown diagrammatically in Fig. 20 where gear pump 81 is shown as providing the fluid pressure for operating the several parts. Fluid from pump 81 passes through the pressure regulator 106 and from thence through passage 107 and a super-charger automatic regulator 108 to the intake for pump 21, to supply the latter with any adjusted volume of fluid at a substantially constant low pressure.

Fluid also passes from a branch of passage 107 to the carriage control valve 109 which is of the plunger type operated by a pivotal lever 110 on the front of apron 13. When lever 110 is in upright position the valve 109 is in neutral closed position and the carriage is at a standstill.

When lever 110 and valve 109 are in neutral position fluid pressure flows from the high pressure line 107 leading to valve 109, through a regulator valve 111 to a cylinder 112 which effects clamping of one of the ways 12 to thereby hold carriage 7 stationary. A manual clamp bolt 113, operable by a wrench, is also provided for clamping the carriage stationary to the way 12.

Movement of lever 110 to the left one notch to what is called "feed position" pushes the plunger of valve 109 inwardly and connects passage 107 through a longitudinal passage 114 in the valve plunger 115 to line 116 leading to a routing valve 117 which passes fluid pressure on to line 118 leading to clutch cylinder 63 to close clutch 61 and start the feed of the carriage. At the same time a branch 119 of line 118 connects through routing valve 120 to the regulator valve 111 to shift the latter and thereby disconnect clamp cylinder 112 from pressure line 107 and connect cylinder 112 to drain.

Movement of lever 110 a second notch to the left to what is called "semi-traverse" position pushes the plunger of valve 109 inwardly sufficiently to connect passage 107 directly through a check valve 121 to passage 122 leading from pump 21 through valve 101 and distributor 47 to the motor 23, thereby supplying an additional quantity of fluid to motor 23 to effect semi-traverse of the carriage. When the plunger of the valve 109 is in semi-traverse position fluid pressure is still transmitted from passage 107 through valve 109, line 116, and routing valve 117 to line 118 to keep clutch 56—57 closed and clamp 112 released.

Movement of lever 110 to the left one more notch, to the extreme traverse position for the lever, connects passage 107 through valve 109 to a passage 123 leading pressure fluid to the right hand cylinder 80 to thereby shift the traverse clutch 66 to forward traverse for the carriage. At the same time fluid pressure is admitted from passage 123 through routing valves 124 and 120 to the piston of regulator valve 111 to maintain clamp cylinder 112 connected with sump 82 and fluid is vented from passage 118 to open clutch 56—57.

Figure 3:
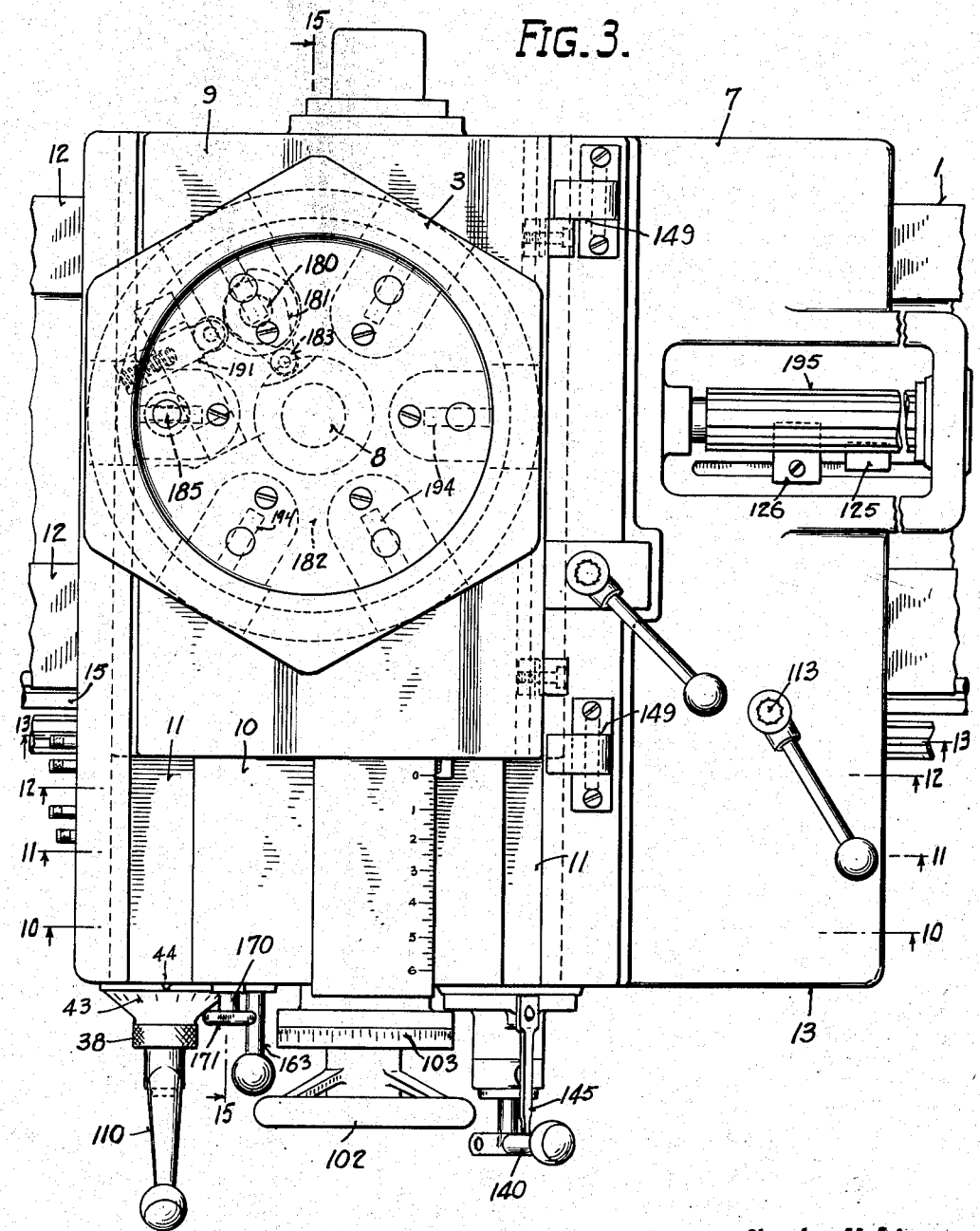
Fig. 3 is an enlarged top plan view of the turret saddle and carriage.

In a normal cycle of operation for the lathe the lever 110 will be moved left to forward traverse for carriage 7 and will be held there by the operator until the tool reaches a point near its initial cutting position, and then either the operator or a trip may effect movement of lever 110 to forward feed position for the carriage. When the cutting operation is completed, an adjustable stop 125 (Fig. 3) on the carriage engages a stop member 126 on the bed and prevents further forward movement of the carriage. A hydraulic back pressure immediately builds up in line 122 (Fig. 20) between pump 21 and motor 23. The pressure build up in line 122 trips a valve 127 sending pressure fluid to a small piston-operated trip release 128 for lever 110 and the latter is then automatically returned to neutral by the spring 129 in valve 109. The operator then moves lever 110 to the right to extreme back traverse position wherein pressure fluid is admitted to the back traverse cylinder 80 for clutch 66 and the pressure is vented in cylinder 63 to open clutch 56—57.

Figure 14:
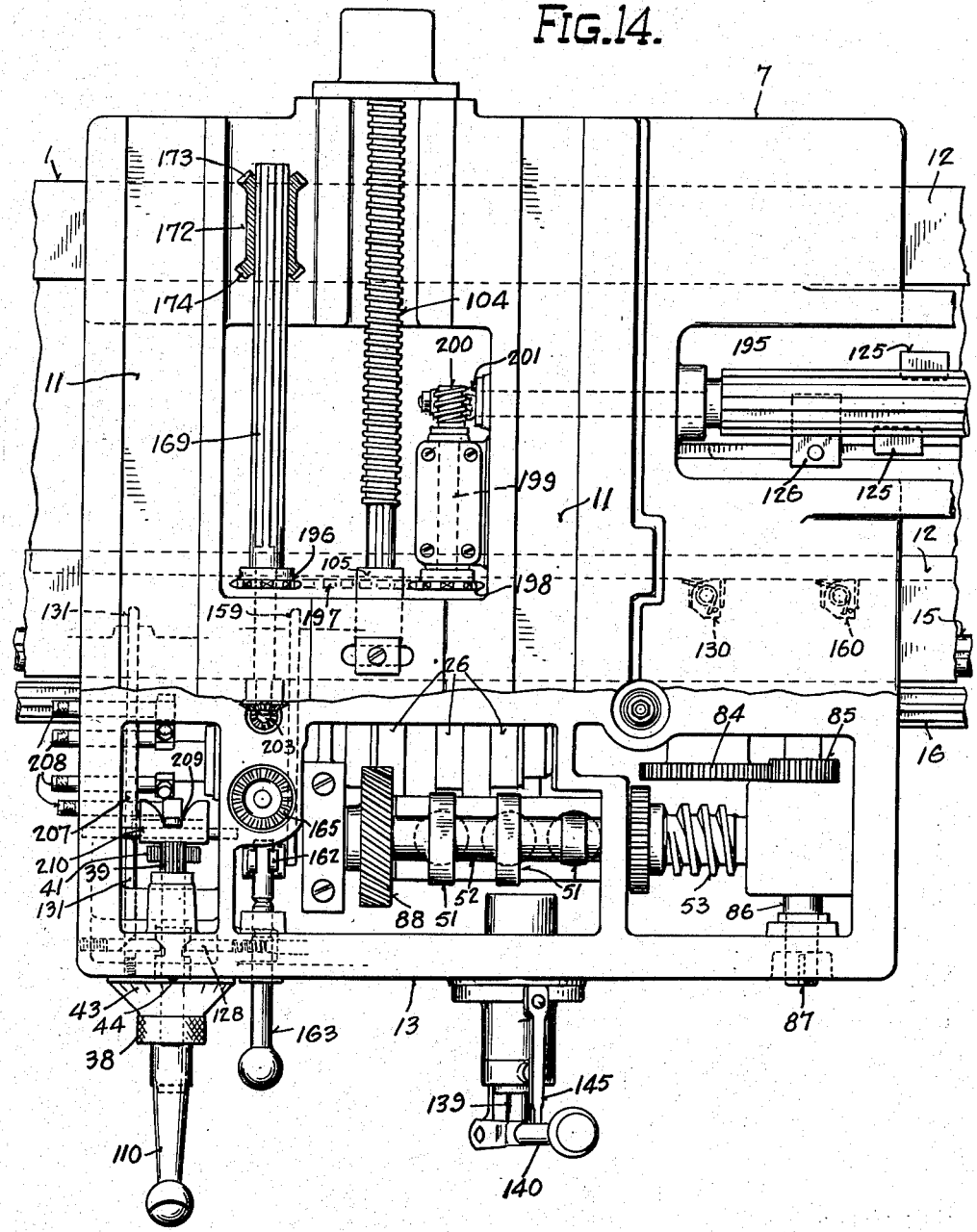
Fig. 14 is a transverse horizontal section taken on line 14—14 of Fig. 2 through the apron and turret saddle with parts broken away to show the turret indexing mechanism.

The carriage 7 continues to back traverse until a trip cam 130 (Figs. 4, 10 and 14) on the bed forces a back traverse release rod 131 to operate trip 128 and release lever 110 from back traverse position and return it to neutral, as shown in detail in Fig. 14.

The spring 129 is constructed in sections to provide for biasing plunger 115 to neutral from either side.

If desired, the operator may move lever 110 to the right selectively to back feed and back semi-traverse positions, respectively, and which function similar to the corresponding forward positions. The reversal of the feed and of semi-traverse in this instance is obtained by the application of fluid pressure to the opposite end of the plunger of valve 101 which thereby reverses the connections to motor 23.

When lever 110 is moved to the left to its several forward movement positions for the carriage, valve 109 admits fluid from passage 107 through a passage 132, router valve 133 and passage 134 to one end of the plunger of valve 101 to hold the latter in position for driving motor 23 forwardly. When lever 110 is moved to the right to its several back movement positions for the carriage, valve 109 admits fluid from passage 107 through a passage 135, router valve 136 and passage 137 to the opposite end of the plunger of valve 101 to hold the latter in position for driving the motor 23 in a reverse direction. The opposite end of the plunger in valve 101 from that to which fluid is admitted, is always connected to drain through valve 109.

The cross slide 9 is semi-traversed and fed in and out by means of a valve 138 which serves to operate the cross slide either in conjunction with the operation of carriage 7 or separately therefrom.

The plunger 139 of valve 138 is operated by lever 140 pivoted on the front of apron 13 and which has a central neutral position, and moves inwardly to an inward feed position for the cross slide and then to an inward semi-traverse position for the cross slide, and moves outwardly to an outward feed position and then to an outward semi-traverse position. All positions of valve 138 except neutral, transmit fluid pressure from a branch of line 107 through valve 138, and either passage 141, or 142, router valve 143 and passage 144 to cylinder 95 to close clutch 90—92 and effect movement of the cross slide from motor 23. Valve 138 is connected to reversing valve 101 to effect operation of the latter and of motor 23 when valve 109 is in neutral position. Valves 109 and 138 are inter-dependent in determining the action of motor 23. Lever 140 is tripped for automatic return to neutral position by means of the fluid cylinder trip 145 operated by valve 127 simultaneously with the operation of trip 128 for lever 110.

When lever 140 and valve 138 are in central neutral position clutch 90—92 is held open by its springs and cylinder 95 is connected to drain through passage 144 and valve 138.

When lever 140 moves the plunger 139 of valve 138 inwardly one notch to feed position for the cross slide, fluid pressure is admitted from line 107 through valve 138 directly to line 142 and cylinder 95 to close clutch 90—92. At the same time fluid is admitted from line 142 through passage 146, routing valve 136 and line 137 to hold the plunger of valve 101 in back (inward) feed position.

When lever 140 moves the plunger 139 of valve 138 inwardly a second notch to inward semi-traverse position for the cross slide, fluid pressure is admitted from line 107 directly to line 147 leading to the center port 148 of valve 109 and from thence to check valve 121 which is operated as previously described to increase the flow of pressure fluid to motor 23. A suitable adjustable stop 149 at each end of the movement for the cross slide effects a pressure build-up in line 122 operating valve 127 which in turn operates trip 145, returning lever 140 to neutral by means of the double acting spring 150.

When lever 140 is moved outwardly to reverse valve 138, the line 141 is supplied with pressure fluid which passes through routing valve 133 to line 134 and holds the plunger of valve 101 in forward (outward) feed position. Outward movement of lever 140 to the second notch passes fluid through line 147 and valve 121 to provide semi-traverse outward movement for the slide.

The valves 109 and 138 are so interlocked in the circuits that operation of either valve to a position away from neutral takes precedence over any attempt to operate the other valve. Any attempt to operate one valve while the other is in operating position will immediately effect operation of the corresponding stop and trip and bring both to a neutral stop position.

Figure 13:
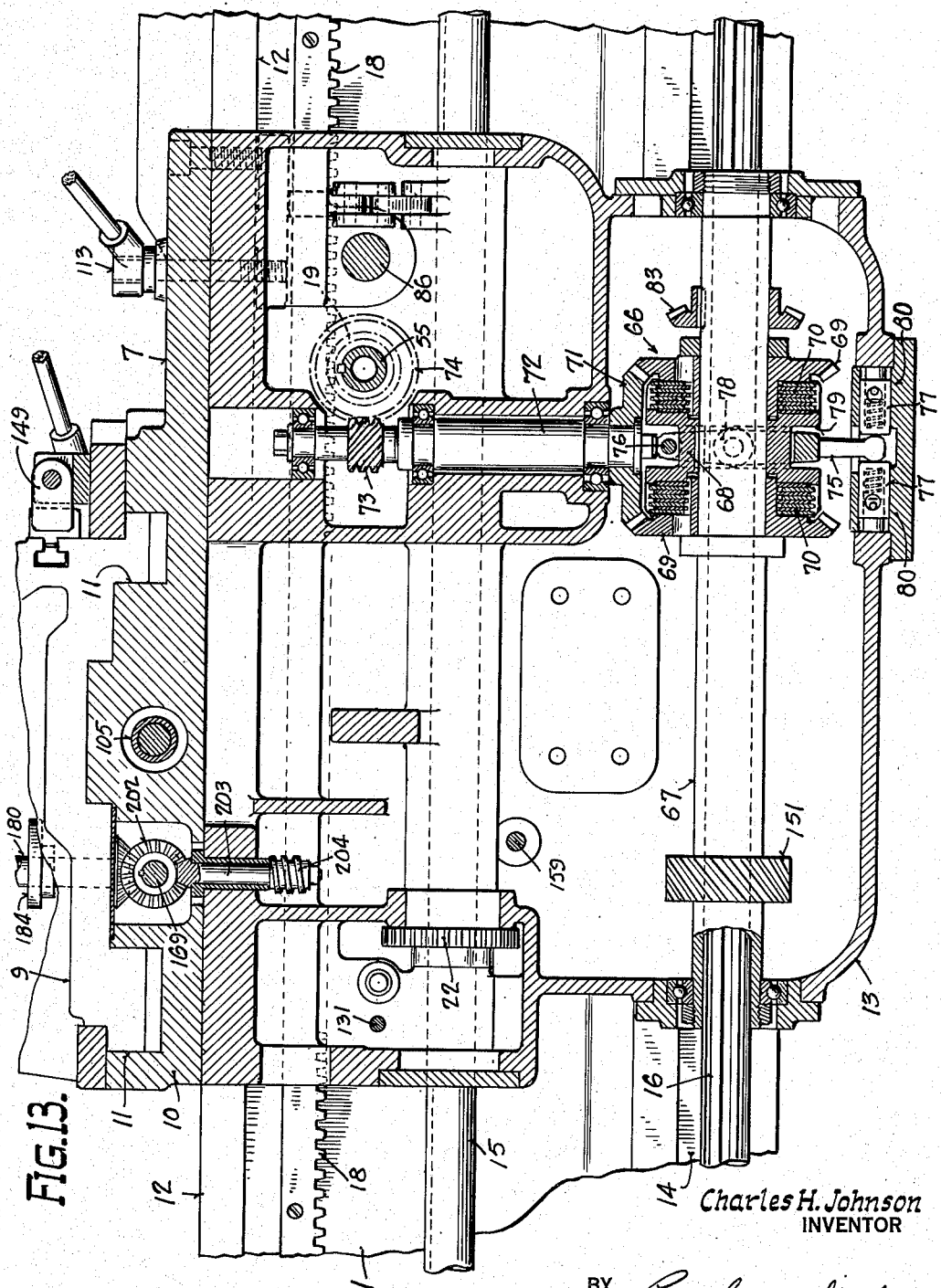
Fig. 13 is a similar section taken on line 13—13 of Fig. 3 through the axis of the traverse shaft showing the rapid traverse clutch.

The indexing of turret 3 is accomplished either manually or automatically in either direction by a drive from the traverse shaft 16, shown in Figs. 5, 13 and 15. The drive comprises a worm gear 151 on sleeve 67 meshing with a corresponding gear 152 carried by a tubular sleeve 153 rotatably mounted to idle on a vertical shaft 154 carried by apron 13. Shaft 154 extends upwardly through a clutch 155 which connects the same to sleeve 153.

Clutch 155 is a single revolution slip clutch which is normally prevented from operation by a pivotal latch 156 engaging a cam stop 157 on the clutch member. When latch 156 is pivoted out of engagement with stop 157 the clutch effects turning of shaft 154 with gear 151 and sleeve 153. A spring 158 is employed to normally hold latch 156 inwardly to engage cam stop 157.

In the construction illustrated the spring 158 is mounted on a trip rod 159 which is pivotally attached to latch 156 and extends toward bed 1 where the free end of rod 159 moves past a trip cam 160 for effecting release of stop 157 by the latch as the carriage moves in back traverse to a position near its extreme limit of backward movement. After rod 159 passes trip 160 the spring 158 functions to pull latch 156 inwardly against a spiral cam 161 leading to stop 157 so that one revolution of the clutch member carrying cam 161 and stop 157 takes place upon each back traverse of carriage 7. Trip 160 is pivotally mounted to allow free passage of rod 159 thereover when carriage 7 moves forwardly.

The release of latch 156 from stop 157 may be effected manually for the purpose of indexing the turret 3, as desired. This manual operation of the latch may be utilized to effect the skipping of one or more faces of the turret in the indexing operation by holding latch 156 out of engagement with cam 161 and stop 157 to allow more than one revolution of shaft 154 by clutch 155.

The manual operation of clutch latch 156 is effected by lever 162 having its free upper end controlled by a push-pull rod 163 extending through the front of apron 13. Inward pushing of rod 163 causes an arm of lever 162 to engage an arm on latch 156 and pivot the latter out of contact with stop 157. Release of rod 163 by the operator allows spring 158 to return latch 156 into engagement with cam 161 and rod 163 to neutral position. A spring pressed detent 164 secures rod 163 in normal neutral position wherein the clutch 155 is operated automatically by trip rod 159 in response to back traverse of the carriage as previously explained.

Outward pulling of rod 163 to a second detent position for detent 164 effects raising of the coupling member between clutch 155 and shaft 154, thereby disconnecting the index drive altogether to allow for manual setting of the turret 3.

The turret indexing, clamping and locking mechanism is generally similar to that set forth in the joint application of the present inventor and L. E. Godfriaux, Serial Number 758,500, filed July 2, 1947, now Patent No. 2,635,326, granted April 21, 1953, for Automatic Turret Indexing Mechanism for Lathes, and which is assigned to the same assignee as the present invention.

The upper end of shaft 154 has a beveled gear 165 disposed intermediate a forward beveled gear 166 and a reverse bevel gear 167 mounted on a sleeve 168 splined to a cross shaft 169. The sleeve 168 is movable in and out by a push-pull rod 170 extending through the front of the apron 13 and which has a hand knob 171 thereon for manual control to effect driving of shaft 169 alternatively by the forward gear 166 and by the reverse gear 167 from shaft 154. Gears 165, 166 and 167 have the same number of teeth so that one revolution of shaft 154 drives shaft 169 through a single revolution.

Shaft 169 is carried by carriage 7 and extends transversely of the bed 1 parallel to the slide feed screw 104 and adjacent thereto in a space in the cross slide beneath the turret. The rear end of shaft 169 has a sleeve 172 splined thereto and having a pair of spaced bevel gears 173 and 174 thereon to rotate with shaft 169 in any position of the cross slide, the sleeve 172 being carried in axial movement along the shaft corresponding to the movement of the cross slide.

Gear 173 on sleeve 172 and shaft 169 drives a vertical shaft 175 operating the eccentric cranks 176 for tightening and loosening the clamp band 177 encircling the tapered flanges 178 and 179 of the turret and its supporting base, respectively. The eccentrics 176 are disposed to provide maximum tightening of band 177 at the position where the indexing mechanism is stopped by stop 157, and the shape of the eccentrics should provide for a substantial loosening of the band for indexing of the turret upon initial rotation of shaft 154.

Gear 174 on sleeve 172 and shaft 169 drives a vertical shaft 180 which carries a crank 181. A Geneva movement groove 182 is disposed in the underside of the bottom of turret 3 and receives a roller 183 mounted on crank 181. The crank is positioned relative to the driving clutch stop 157 to provide that the crank roller 183 will be in that portion of cam 182 in which movement of roller 183 by shaft 180 has substantially no effect upon rotation of the turret at the time the indexing operation is stopped by stop 157. Upon initiation of an indexing operation the rotation of roller 183 by shaft 180 through one revolution effects a rotation of turret 3 by the Geneva movement cam 182 a distance corresponding to that between two adjacent faces of the turret. The cam 182 is shaped to effect a gradual acceleration and deceleration in the indexing movement of the turret.

The shaft 180 also carries a cam 184 beneath crank 181 for operating the locking pin 185 in timed relation with the indexing rotation of the turret. The mechanism illustrated for operating the indexing pin comprises a rack 186 on the side of pin 185 engaged by a gear 187 on a cross shaft 188 having a second gear 189 engaging a rack 190 on a reciprocable member 191 carrying a roller 192 engaging cam 184. The pin lock 185 is normally held in upward indexing position in a corresponding index slot 194 of turret 3 by means of a spring 193 at the lower end of pin 185.

During a single indexing movement of turret 3 in either direction, when latch 156 is withdrawn from stop 157, shaft 154 is rotated through one revolution and initially effects withdrawal of lock pin 185 from turret 3, the unclamping of band 177 freeing the turret for rotation by crank roller 183 and Geneva cam 182. Following rotation of turret 3 to nearly its final index position, cam 184 allows lock pin 185 to be forced into position to lock the turret and then band 177 is tightened thereon to clamp the turret in position.

The carriage 7 has a plurality of stops 125 disposed in adjusted position on an indexing stop rod 195 extending longitudinally from the carriage. Each stop 125 corresponds to the desired stop position of the carriage for the tool on a particular corresponding face of the turret 3. The stop rod 195 is indexed with the turret 3 by means of a sprocket 196 on cross shaft 169, chain 197, sprocket 198 on a second shaft 199 and a worm gear 200 on shaft 199 meshing with a corresponding gear 201 on the shaft or stop rod 195. Rotation of cross shaft 169 through one revolution effects an indexing rotation of stop rod 195 through a part of a revolution corresponding to the indexing rotation of turret 3 from one face to an adjacent face, to thereby position the corresponding stop 125 for engagement with the stop 126.

The turret 3 may be indexed manually at any time by pulling on rod 163 which will then release the turret for turning.

The invention also provides means for pre-selecting the feed of the carriage 7 in correlation to the indexing of the turret 3. For this purpose a beveled gear 202 on cross shaft 169 drives a vertical shaft 203 having a worm gear 204 at its lower end. Gear 204 drives a corresponding gear 205 on a horizontal shaft 206 carrying a rotary speed selecting member 207 disposed in the end of apron 13.

Member 207 carries a plurality of accurately adjustable speed selector pins 208 corresponding in number and in indexing position to the several faces of turret 3.

The pin 208 corresponding to the operative face of turret 3 in any given index position of the turret is disposed in a cam groove 209 in a slide block 210 which is mounted to slide on two parallel rods 211 carried by apron 13 adjacent to gear segment 41. The block 210 is tied to segment 41 by a loose pin and roller 212 so that movement of block 210 in one direction provides a corresponding pivotal movement for segment 41 and movement of block 210 in the opposite direction provides a corresponding pivotal movement for segment 41 in the opposite direction.

The adjusted position of each selector pin 208 as it rotates into indexed position in cam groove 209 determines the position of block 210 and the corresponding position of segment 41 and lever 36 controlling the setting of button 32 and the capacity of pump 21. Should the operator forget to manually set the speed selector knob 38 for any given turret face, the automatic preselector will function through the corresponding pin 208 to effect the required setting and speed selection.

The invention provides for both manual and semi-automatic operation of the lathe with either manual or automatic pre-selection of the feed rates.

The operator of the lathe is free from the burdensome mental and physical problems arising from always having to determine and carry out a large number of sequential movements. In general, after he has started the lathe on one cycle of operation he does not have to follow it with starting each successive step in the cycle, although the construction is such that he can always stop the operations at any instant or point in the cycle. This leaves the lathe under the full control of the operator at all times without requiring him to mentally decide upon each successive step.

The invention makes it possible for a slow operator to rely upon the lathe and to produce the same amount in a given time as a normally fast operator would do with a fully manual lathe.

The operator no longer has to force himself in deciding upon each successive operation and moving a lever to initiate the same. With the present invention he can supervise the work with a minimum of initiating decisions and acts, and can stop it any time where necessary.

There is one lever, 110, to control forward and back feed, semi-traverse and traverse, and this lever automatically changes from forward traverse to semi-traverse and to feed, and is finally tripped from feed to stop. The back traverse stop also trips lever 110 to neutral and automatically initiates the indexing of the turret to the next face. The turret is automatically indexed and clamped. The cross semi-traverse and feed are similarly controlled by a single hand of the operator. Clamping of the carriage and also the selection of feed rates are made automatic.

The pump-motor unit illustrated provides a very convenient variable feed means which may be varied by simple control means. It is possible that certain features of the invention may be employed with other types of variable feeds.

Various embodiments of the invention may be employed within the scope of the accompanying claims.

I claim:

1. In a manually operable turret lathe having a bed with a headstock, a rotary spindle carried by the headstock, a feed shaft rotated in correlation to the rotation of the spindle, a turret and a turret carriage operable on ways on the bed, a hydraulic pump-motor unit on said carriage with the pump driven from said feed shaft and having infinitely variable adjustment in capacity within the range of feeds required and with the motor variable in speed corresponding to the output of the pump and having substantially constant torque output characteristics throughout the range of feeds required, means disposed to feed said carriage by said motor, and manual means disposed to adjust the capacity of said pump and thereby select the feed rate for said carriage.

2. In a manually operable turret lathe having a bed with a headstock, a rotary spindle carried by the headstock, a feed shaft rotated in correlation to the rotation of the spindle, a turret and a turret carriage operable on ways on the bed, a hydraulic pump-motor unit on said carriage with the pump driven from said feed shaft and having infinitely variable adjustment in capacity within the range of feeds required and with the motor variable in speed corresponding to the output of the pump and having substantially constant torque output characteristics throughout the range of feeds required, means disposed to feed said carriage by said motor, manual means disposed to adjust the capacity of said pump and thereby select the feed rate for said carriage, and automatic pre-selector means operable in correlation to the indexing of said turret and disposed to set the capacity of said pump and thereby select the feed rate for said carriage.

3. In a manually operable turret lathe having a bed with a headstock, a rotary spindle carried by the headstock, a feed shaft rotated in correlation to the rotation of the spindle, a traverse shaft, a turret and a turret carriage operable on ways on the bed, a transmission on said carriage driven from said feed shaft and having infinitely variable adjustment in speed within the range of feeds required, means disposed to feed said carriage by said transmission, means disposed to disconnect said last named means, means correlated with the operation of said disconnecting means and disposed to establish a traverse drive for said carriage from said traverse shaft, and manual means disposed to adjust the speed of said transmission and thereby select the feed rate for said carriage.

4. In a manually operable turret lathe having a bed with a headstock, a rotary spindle carried by the headstock, a feed shaft rotated in correlation to the rotation of the spindle, a traverse shaft, a turret and a turret carriage operable on ways on the bed, a transmission on said carriage driven from said feed shaft and having infinitely variable adjustment in speed within the range of feeds required, means disposed to feed said carriage by said transmission, means disposed to disconnect said last named means, means correlated with the operation of said disconnecting means and disposed to establish a traverse drive for said carriage from said traverse shaft, and manual means operable alternatively to said power feed and traverse means for feeding said carriage for tool set-up purposes.

5. In a manually operable turret lathe having a bed with a headstock, a rotary spindle carried by the headstock, a feed shaft rotated in correlation to the rotation of the spindle, a turret and a turret carriage operable on ways on the bed, a hydraulic transmission unit on said carriage driven from said feed shaft and having infinitely variable adjustment in capacity within the range of feeds required, means disposed to feed said carriage by said transmission, manual means disposed to adjust the capacity of said transmission and thereby select the feed rate for said carriage, a stop for said carriage, and means operated by fluid pressure change resulting from said stop and disposed to trip the feed operation of said transmission and effect back movement of said carriage.

6. In a manually operable turret lathe having a bed with a headstock, a rotary spindle carried by the headstock, a feed shaft rotated in correlation to the rotation of the spindle, a turret and a turret carriage operable on ways on the bed, a hydraulic transmission unit on said carriage driven from said feed shaft and having infinitely variable adjustment in capacity within the range of feeds required and having substantially constant torque output characteristics throughout the range of feeds required, means disposed to feed and semi-traverse said carriage by said transmission, and a single manual valve control for selectively effecting forward and back feed and forward and back semi-traverse movement of said carriage by said transmission.

7. In a manually operable turret lathe having a bed with a headstock, a rotary spindle carried by the headstock, a feed shaft rotated in correlation to the rotation of the spindle, a turret and a turret carriage operable on ways on the bed, a hydraulic pump-motor unit on said carriage with the pump driven from said feed shaft and having infinitely variable adjustment in capacity within the range of feeds required and with the motor variable in speed corresponding to the output of the pump and having substantially constant torque output characteristics throughout the range of feeds required, means to feed said carriage by said motor, manual means to adjust the capacity of said pump and thereby select the feed rate for said carriage, and a single manual valve control for selectively effecting forward and back feed and forward and back traverse movement of said carriage by said unit.

8. In a manually operable turret lathe having a bed with a headstock, a rotary spindle carried by the headstock, a feed shaft rotated in correlation to the rotation of the spindle, a traverse shaft, a turret and a turret carriage operable on ways on the bed, a hydraulic transmission unit on said carriage driven from said feed shaft and having infinitely variable adjustment in capacity within the range of feeds required, means to feed said carriage by said transmission, means to disconnect said last named means, means correlated with the operation of said disconnecting means to establish a traverse drive for said carriage from said traverse shaft, a single manual valve control for selectively effecting forward and back feed and forward and back traverse movement of said carriage by said transmission, said valve control having a neutral position for stopping said carriage movement, and hydraulic means operable automatically in correlation to said valve to clamp said carriage when said valve is in neutral position.

9. In a manually operable turret lathe having a bed with a headstock, a rotary spindle carried by the headstock, a feed shaft rotated in correlation to the rotation of the spindle, a traverse shaft, a turret and a turret carriage operable on ways on the bed, hydraulic means operable in correlation to said feed shaft to effect feed of said carriage, means to effect traverse of said carriage from said traverse shaft, and hydraulic means automatically clamping said carriage when both said feed means and said traverse means are inoperable.

10. In a manually operable turret lathe having a bed with a headstock, a rotary spindle carried by the headstock, a feed shaft rotated in correlation to the rotation of the spindle, a traverse shaft, a turret and a turret carriage operable on ways on the bed, hydraulic means operable in correlation to said feed shaft to effect feed of said carriage, means to effect traverse of said carriage from said traverse shaft, hydraulic means automatically clamping said carriage when both said feed means and said traverse means are inoperable, and separate manual means for clamping said carriage.

11. In a manually operable turret lathe having a bed with a headstock, a rotary spindle carried by the headstock, a feed shaft rotated in correlation to the rotation of the spindle, a traverse shaft, a turret and a turret carriage operable on ways on the bed, hydraulic means operable in correlation to said feed shaft to effect feed of said carriage, means to effect traverse of said carriage from said traverse shaft, hydraulically operated clutches for connecting and disconnecting said feed and traverse drives and for reversing said traverse drive, hydraulically operated means for reversing said feed drive, and manual valve means for controlling operation of said clutches and reversing means.

12. In a manually operable turret lathe having a bed with a headstock, a rotary spindle carried by the headstock, a feed shaft rotated in correlation to the rotation of the spindle, a turret carriage operable on ways on said bed, a cross slide on said carriage, and a turret on said cross slide; a transmission unit on said carriage driven from said feed shaft and having substantially infinitely variable adjustment in capacity within the range of feeds required, means to feed said carriage by said transmission, and means to feed said cross slide by said transmission either separately from or in correlation to the feed of said carriage.

13. In a manually operable turret lathe having a bed with a headstock, a rotary spindle carried by the headstock, a feed shaft rotated in correlation to the rotation of the spindle, a turret carriage operable on ways on said bed, a cross slide on said carriage, and a turret on said cross slide; a transmission unit on said carriage driven from said feed shaft and having substantially infinitely variable adjustment in capacity within the range of feeds required, means to feed said carriage by said transmission, means to feed said cross slide by said transmission either separately from or in correlation to the feed of said carriage, and manual means for feeding said cross slide alternative to said transmission feed therefor.

14. In a manually operable turret lathe having a bed with a headstock, a rotary spindle carried by the headstock, a feed shaft rotated in correlation to the rotation of the spindle, a turret carriage operable on ways on said bed, a cross slide on said carriage, and a turret on said cross slide; a transmission unit on said carriage driven from said feed shaft and having substantially infinitely variable adjustment in capacity within the range of feeds required, means to feed said carriage by said transmission, means to feed said cross slide by said transmission either separately from or in correlation to the feed of said carriage, and means to reverse the output of said transmission to effect back movement of both said carriage and said cross slide at will.

15. In a manually operable turret lathe having a bed with a headstock, a rotary spindle carried by the headstock, a feed shaft rotated in correlation to the rotation of the spindle, a traverse shaft, a turret carriage operable on ways on said bed, a cross slide on said carriage, and a turret on said cross slide; hydraulic means operable in correlation to said feed shaft to effect feed and semi-traverse of both said carriage and said cross slide, and means to effect traverse of said carriage from said traverse shaft.

16. In a manually operable turret lathe having a bed with a headstock, a rotary spindle carried by the headstock, a feed shaft rotated in correlation to the rotation of the spindle, a traverse shaft, a turret carriage operable on ways on said bed, a cross slide on said carriage, and a turret on said cross slide; hydraulic means operable in correlation to said feed shaft to effect feed and semi-traverse of both said carriage and said cross slide, means to effect traverse of said carriage from said traverse shaft, and manual means for controlling said hydraulic means and said traverse means at will.

17. In a manually operable turret lathe having a bed with a headstock, a rotary spindle carried by the headstock, a traverse shaft, a turret carriage operable on ways on said bed, a cross slide on said carriage, and a turret on said cross slide; means operable by said traverse shaft to index said turret, trip means disposed between said bed and carriage for automatically initiating operation of said turret indexing means in correlation to movement of said carriage, and manual means for initiating operation of said turret indexing means at will.

18. In a manually operable turret lathe having a bed with a headstock, a rotary spindle carried by the headstock, a traverse shaft, a turret carriage operable on ways on said bed, a cross slide on said carriage, and a turret on said cross slide; means operable by said traverse shaft to index said turret, trip means disposed between said bed and carriage for automatically initiating operation of said turret indexing means in correlation to movement of said carriage, and manual means for disconnecting said automatic turret index means, 19. In a manually operable turret lathe having a bed with a headstock, a rotary spindle carried by the headstock, a traverse shaft, a turret carriage operable on ways on said bed, a cross slide on said carriage, and a turret on said cross slide; means operable by said traverse shaft to index said turret, trip means disposed between said bed and carriage for automatically initiating operation of said turret indexing means in correlation to movement of said carriage, manual means for disconnecting said automatic turret index means, and manual means for indexing said turret.

20. In a manually operable turret lathe having a bed with a headstock, a rotary spindle carried by the headstock, a feed shaft rotated in correlation to the rotation of the spindle, a traverse shaft, and a carriage operable on ways on said bed; hydraulic means operable in correlation to said feed shaft to effect feed of said carriage, means to effect traverse of said carriage from said traverse shaft, and manual means for controlling said hydraulic means and said traverse means at will.

21. In a lathe having a bed with a headstock, a rotary spindle carried by the headstock, a feed shaft rotated with the rotation of the spindle, a carriage operable on the ways of said bed for carrying a tool, a transmission unit on said carriage driven from said feed shaft and having a substantially infinitely variable adjustment in capacity within the range of feeds required, means to feed said carriage by said transmission including a clutch connecting said means and transmission unit, a traverse shaft driven at a relatively constant speed, mechanical transmission means carried by the carriage and operatively connected to said means to feed the carriage, a second clutch means connecting said traverse shaft and mechanical transmission means, and a lever carried by the carriage and operatively connected to said named clutches and transmission unit, said lever being movable in opposite directions to any of several positions including: a central position which effects the disengagement of both said clutches, a first position in each direction from said central position which effects the engagement of said first clutch and the operation of said transmission unit respectively in forward and reverse directions and the corresponding feed of the carriage, and a second position in each direction from said central position which effects the disengagement of said first named clutch and the selective engagement of said second clutch means to effect the corresponding traverse of the carriage at a predetermined, relatively constant speed in corresponding forward and reverse directions.

22. The invention as defined in claim 21 wherein the lathe further includes an automatic means disposed to change the lever and effect successive movements in accordance with a given cycle of operation subject at all times to the over-riding control of the operator providing for stopping of carriage movement at any time.

CHARLES H. JOHNSON.

References Cited in the file of this patent

UNITED STATES PATENTS

| Number | Name | Date |
|---|---|---|
| 1,291,488 | Haas | Jan. 14, 1919 |
| 1,854,127 | Ferris | Apr. 12, 1932 |
| 2,008,010 | Foster | July 16, 1935 |
| 2,008,011 | Foster | July 16, 1935 |
| 2,118,021 | Curtis | May 17, 1938 |
| 2,151,873 | Senger | Mar. 28, 1939 |